United States Patent [19]

Wurtz

[11] Patent Number: 4,941,705
[45] Date of Patent: Jul. 17, 1990

[54] FRAME ASSEMBLY FOR PICKUP TRUCK BED COVER

[76] Inventor: David B. Wurtz, 5868 Massillon Rd., Dalton, Ohio 44618

[21] Appl. No.: 377,316

[22] Filed: Jul. 10, 1989

[51] Int. Cl.⁵ .............................................. B60J 7/10
[52] U.S. Cl. ................................................... 296/100
[58] Field of Search .................. 296/100, 98; 160/327, 160/328

[56] References Cited

U.S. PATENT DOCUMENTS

| | | | |
|---|---|---|---|
| 3,768,540 | 10/1973 | McSwain | 160/23 R |
| 4,199,188 | 4/1980 | Albrecht et al. | 296/100 |
| 4,273,377 | 6/1981 | Alexander | 296/100 |
| 4,285,539 | 8/1981 | Cole | 296/105 |
| 4,405,170 | 9/1983 | Raya | 296/10 |
| 4,693,508 | 9/1987 | Pettit | 296/100 |
| 4,730,866 | 3/1988 | Nett | 296/100 |
| 4,783,112 | 11/1988 | Lovaas | 296/100 |

Primary Examiner—Robert R. Song
Attorney, Agent, or Firm—Daniel J. Hudak Co.

[57] ABSTRACT

A frame assembly is mounted on a pickup truck for selectively removably attaching a flexible cover over an open bed of the truck. The truck bed is defined by a pair of spaced, parallel upright sidewalls and a pair of spaced, parallel upright front and rear walls which extend transversely between the sidewalls. The rear wall is a hingedly mounted tailgate pivotable between an upright closed position and a horizontal open position. Fastening means is located on the cover and the frame assembly for removably attaching the cover to the frame. A pair of elongated side frame members are mounted on and extend along a top edge of the truck sidewalls, and an elongated front frame member is mounted on and extends along a top edge of the truck front wall between a front end of the side frame members. A generally elongated box channel is attached to a rear end of each of the side frame members and forms a slide channel therebetween. An elongated rear frame member extends along a top edge of the closed tailgate and between the rear ends of the side frame members, and is slideably engageable within the slide channels formed between the side frame members and the box channel, so that subsequent to detachment of the cover from the frame assembly, the rear frame member is slideably disengaged from the slide channels to provide unobstructed access to the truck bed upon movement of the tailgate to the open position.

16 Claims, 3 Drawing Sheets

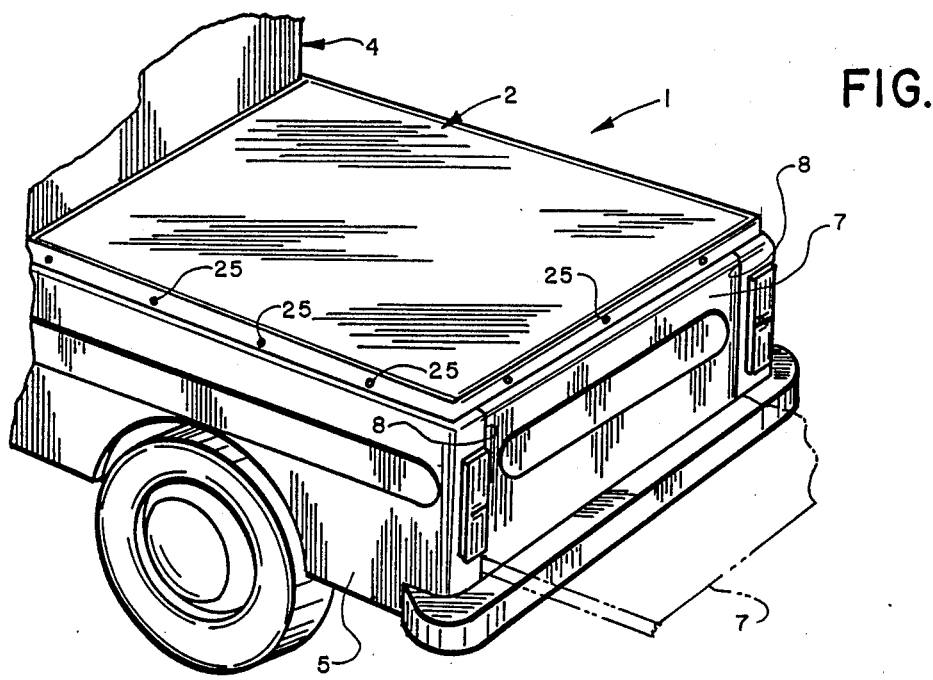
FIG. 1
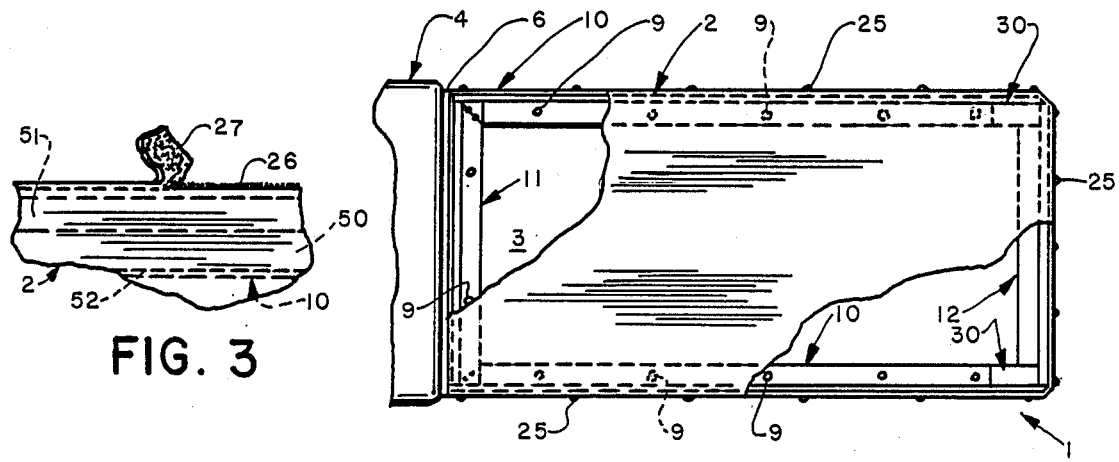
FIG. 3
FIG. 2
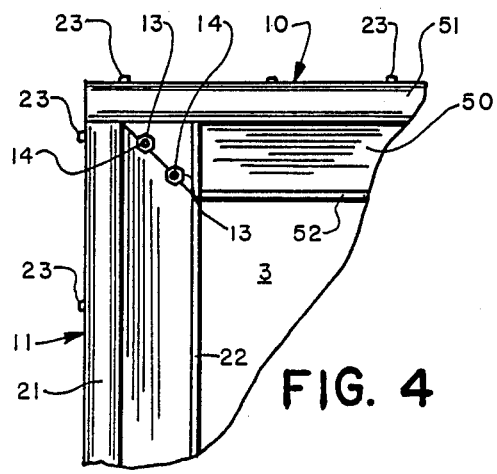
FIG. 4
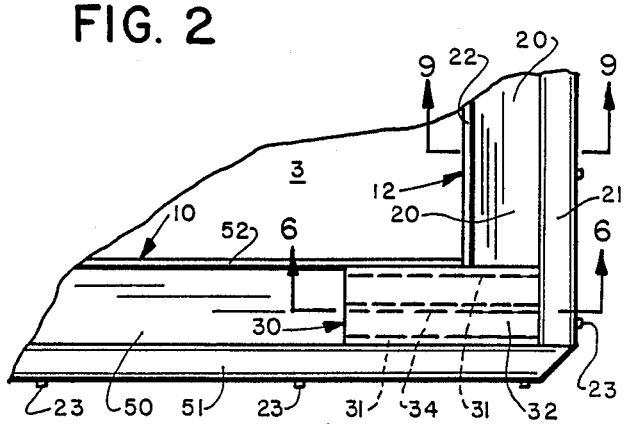
FIG. 5

FRAME ASSEMBLY FOR PICKUP TRUCK BED COVER

BACKGROUND OF THE INVENTION

1. Technical Field

The invention relates to frame assemblies for attaching a cover to selectively protect an open bed of a pickup truck, and in particular to a frame assembly for removably attaching a flexible cover of the type having fastening means located about a periphery thereof. More particularly, the invention relates to such a frame assembly which can be quickly and easily partially disassembled subsequent to detachment of the cover therefrom, to provide unobstructed access to the truck bed upon movement of a tailgate of the truck to an open position.

2. Background Information

Pickup trucks have been and continue to be popular vehicles due to their versatility. In particular, most pickup trucks, in addition to providing transportation, are suitable for travel over rough terrain and for heavy-duty towing such as pulling a trailer, boat, etc. However, one of the most important features of the pickup truck is its capability for carrying bulky, heavy and/or loose loads in the open bed thereof. More specifically, the body of these light trucks is comprised of an enclosed cab and an open bed located behind the cab and partially enclosed by a pair of sidewalls, a front wall, and a rear tailgate which is movable between open and closed positions. Thus, it can be seen that such a bed defined by low walls is suitable for hauling loads such as furniture, sand, gravel, mulch, and numerous other types of loads.

The owner of a pickup truck may also carry loads which he/she desires to protect from inclement weather and/or view. Numerous known prior art pickup truck bed cover frame assemblies exist which provide for releasable attachment of a cover over the open bed of the truck. However, many of these known prior art frame assemblies interfere with access to the truck bed once the cover is removed. Such interference occurs because most of these assemblies include a rear cross member which traverses the tailgate opening, so that a cover may be firmly attached adjacent to all four walls defining the truck bed to prevent rain, snow, etc. from entering the truck bed enclosure when the tailgate is in the closed position. Thus, when it is desired to use the pickup truck for hauling loads which must be carried without the cover in place, such as a large piece of furniture or yard mulch, the rear cross member must be disassembled from the rest of the frame assembly so that the pickup truck user can gain unobstructed access to the bed for loading and unloading. Such disassembly is inconvenient, especially if performed in cold temperatures, poor weather, or in darkness.

The closest known prior art to the improved frame assembly of the present disclosure is shown in U.S. Pat. No. 4,730,866. However, the construction of the assembly disclosed in U.S. Pat. No. 4,730,866 is completely different than the frame assembly disclosed herein.

Thus, the need exists for an improved frame assembly for removably attaching a flexible cover to selectively protect an open bed of a pickup truck, which can be quickly and easily partially disassembled subsequent to removal of the cover to provide unobstructed access to the truck bed upon opening of the tailgate.

SUMMARY OF THE INVENTION

Objectives of the present invention include providing a frame assembly for removably attaching a flexible cover to selectively protect an open bed of a pickup truck, in which the frame assembly can be quickly and easily partially disassembled subsequent to detachment of the cover therefrom, to provide unobstructed access to the truck bed upon movement of the tailgate of the truck to an open position.

Another objective of the invention is to provide such an improved frame assembly which securely removably attaches a flexible cover to protect the items carried on the open bed of a pickup truck from weather such as rain, snow, wind, etc., and which effectively conceals such items from normal view.

A further objective of the present invention is to provide such an improved frame assembly, the main components of which can be produced by the extrusion process of manufacture utilizing only two different extrusion dies, together with several minor cutting operations, and which can be adapted to fit nearly every size and style of pickup truck bed.

Still another objective of the invention is to provide such an improved frame assembly which can be manufactured relatively inexpensively, which is formed of strong, durable, low-maintenance materials which are aesthetically attractive and which will blend in with virtually any pickup truck style.

These objectives and advantages are obtained by the frame assembly of the present invention for attaching a cover over an open bed of a pickup truck, the truck bed having a pair of spaced, parallel upright sidewalls and a pair of spaced, parallel upright front and rear walls, the rear wall being movable between open and closed positions, the general nature of the improved frame assembly being stated as including, a first frame member securely mounted on each of the sidewalls of the truck bed, means attached to each of the first frame members for forming a channel therebetween, and a second frame member extending transversely between the first frame members generally adjacent to the rear wall of the truck, the second frame member being engageable with the channels formed between the first frame members and the means attached to the first frame members, the second frame member being disengageable from the first frame members.

BRIEF DESCRIPTION OF THE DRAWINGS

Preferred embodiments of the invention, illustrative of the best modes in which applicant has contemplated applying the principles, are set forth in the following description and are shown in the drawings and are particularly and distinctly pointed out and set forth in the appended claims.

FIG. 1 is a fragmentary perspective view of the enclosed bed of a usual pickup truck, showing a flexible cover removably attached to the frame assembly of the present invention by a plurality of releasable snap connectors;

FIG. 2 is a fragmentary top plan view, with portions broken away, showing the frame assembly in its intended use;

FIG. 3 is a fragmentary top plan view of a second embodiment of the present invention, and in particular showing a hook and pile fabric materials combination used for removably attaching the cover to the frame assembly;

FIG. 4 is an enlarged fragmentary top plan view of one of the front corners of the frame assembly, showing the manner in which the front frame member is mounted on the truck and interconnected with the side frame member;

FIG. 5 is an enlarged fragmentary top plan view of one of the rear corners of the frame assembly, showing the manner in which the rear frame member is slideably engaged with the side frame member;

Similar numerals refer to similar parts throughout the drawings.

DESCRIPTION OF THE PREFERRED EMBODIMENT

Figure 6:
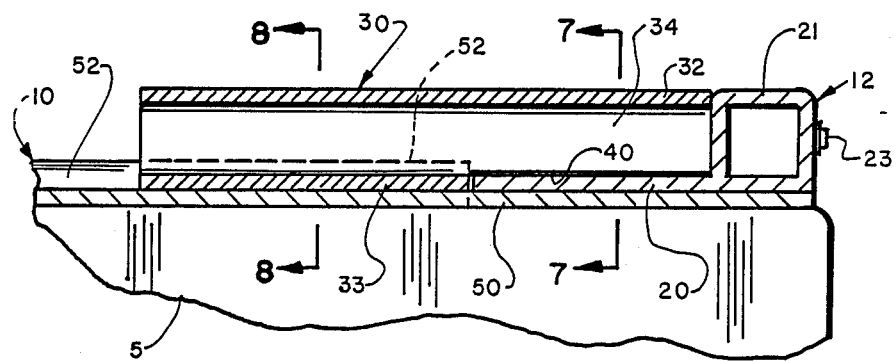
FIG. 6 is an enlarged fragmentary sectional view taken on line 6—6, FIG. 5.

The improved frame assembly of the present invention is indicated generally at 1, and is shown in FIGS. 1 and 2 in its intended use of removably attaching a flexible cover 2 over an open bed 3 of a pickup truck 4. Truck 4 is a usual pickup type having bed 3, which is generally flat and horizontal, defined by a pair of spaced, parallel upright sidewalls 5 and a pair of spaced, parallel upright front and rear walls 6 and 7 which extend transversely between the sidewalls. Rear wall or tailgate 7 typically is hingedly attached to bed 3 in a manner well-known in the art, so that the tailgate is pivotable between an open horizontal position and a closed upright or vertical position, as illustrated in FIG. 1 in broken and full lines, respectively. Thus, when tailgate 7 is in the open position, a tailgate opening 8 is provided between sidewalls 5 for gaining access to truck bed 3.

Frame assembly 1 includes a pair of spaced, parallel elongated side frame members, an elongated front frame member, and an elongated rear frame member, indicated generally at 10, 11 and 12, respectively (FIG. 2). Each side frame member 10 is mounted on a top edge of a respective one of the sidewalls 5 by any suitable means such as sheet metal screws 9, or alternatively, nuts and bolts or clamps. Side frame members 10 extend along a top edge of sidewalls 5 in a spaced, parallel relationship. Front frame member 11 is mounted on and extends along a top edge of front wall 6 by screws 9, and is interconnected with and extends transversely between a front end of side frame members 10, by nuts 13 and bolts 14 (FIG. 4). Rear frame member 12 extends along a top edge of closed tailgate 7, and extends transversely between and is slideably engaged with side frame members 10, as will be described in detail below.

Figure 9:
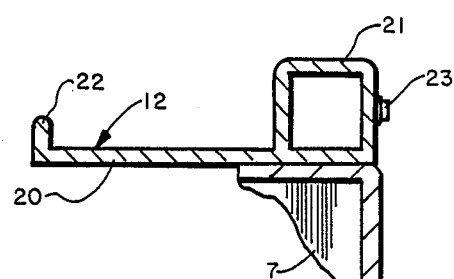
FIG. 9 is an enlarged fragmentary sectional view taken on line 9—9, FIG. 5.
Figure 10:
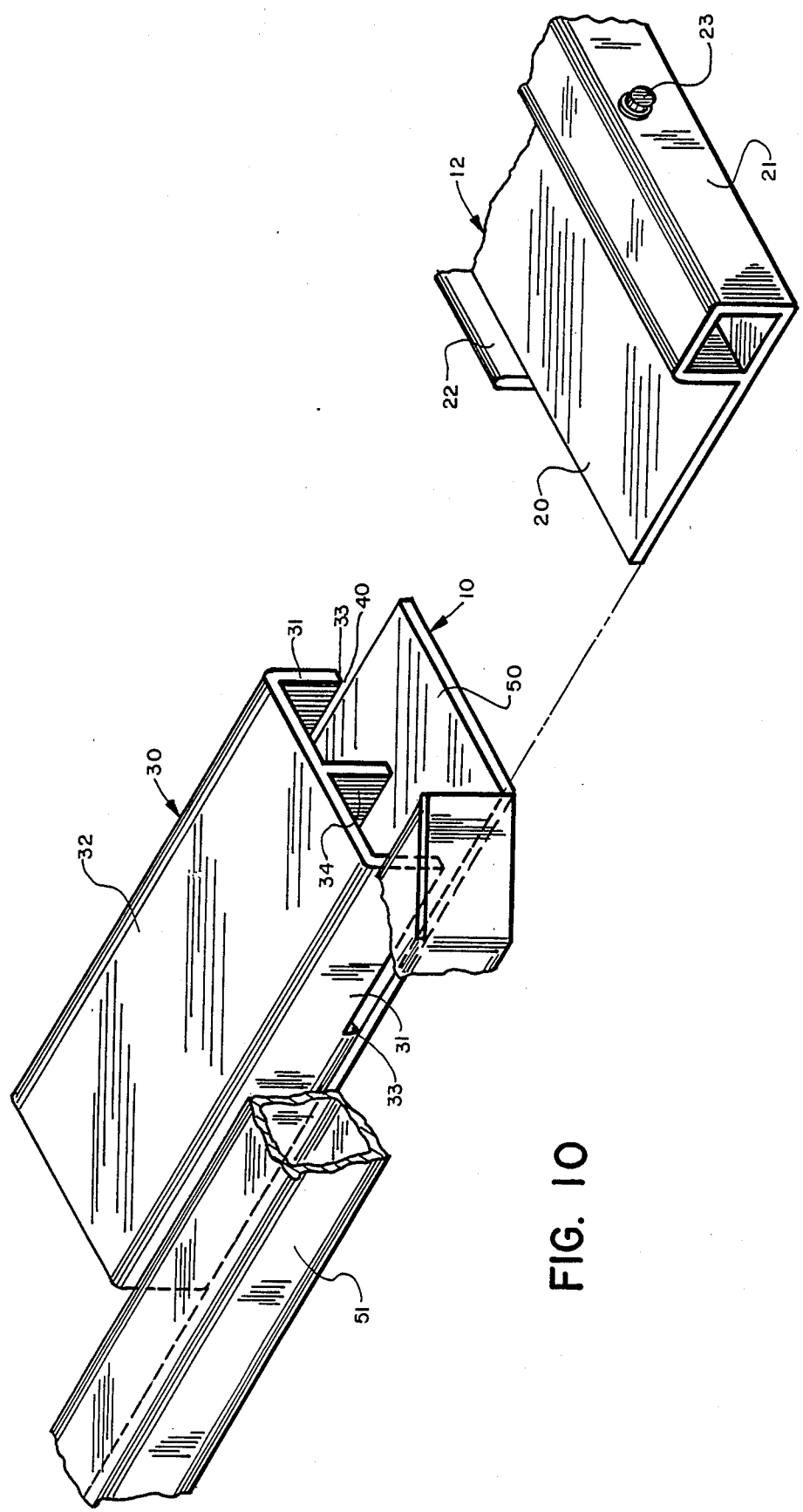
FIG. 10 is an enlarged fragmentary exploded perspective view, with portions broken away and in section, showing the manner in which the rear frame member slideably engages one of the side frame members of the improved frame assembly for removably attaching the rear frame member thereto.

Since front and rear frame members 11 and 12 are similar, only rear frame member 12 will be described in detail. Rear frame member 12 is an extruded, integral one-piece member preferably formed of aluminum (FIGS. 2, 9 and 10). Rear frame member 12 includes a flat base 20 and an upright, tubular flange 21 formed along an outer edge of base 20. The tubular shape of flange 21 provides strength thereto. An upright lip 22 is formed on an inner edge of flat base 20 and provides additional strength to the base.

Upright lip 22 extends along the entire length of the inner edge of flat base 20 of front frame member 11, and along a substantial length of the inner edge of flat base 20 of rear frame member 12. The ends of rear frame member 12 are free of lip 22 to provide for interconnection of rear frame member 12 with side frame members 10, as best shown in FIGS. 5-7 and 10. Lip 22 is removed from the ends of rear frame member 12 by a simple cutting operation performed after extrusion of member 12.

Since side frame members 10 are similar, only one will be described in detail. Side frame member 10 is an extruded, two-piece member preferably formed of aluminum (FIGS. 2, 5-8, and 10). Side frame member 10 includes a flat base 50 and an upright, tubular flange 51 formed along an outer edge of base 50. The tubular shape of flange 51 provides strength thereto. An upright lip 52 is formed on an inner edge of flat base 50 and provides additional strength to the base.

Upright lip 52 extends along a substantial length of the inner edge of flat base 50 of side frame member 10. The ends of side frame member 10 are free of lip 52 to provide for interconnection of front and rear frame members 11 and 12 with side frame members 10, as best shown in FIGS. 2, 4-7 and 10. Lip 52 is removed from the ends of side frame members 10 by a simple cutting operation performed after extrusion of members 10.

Figure 7:
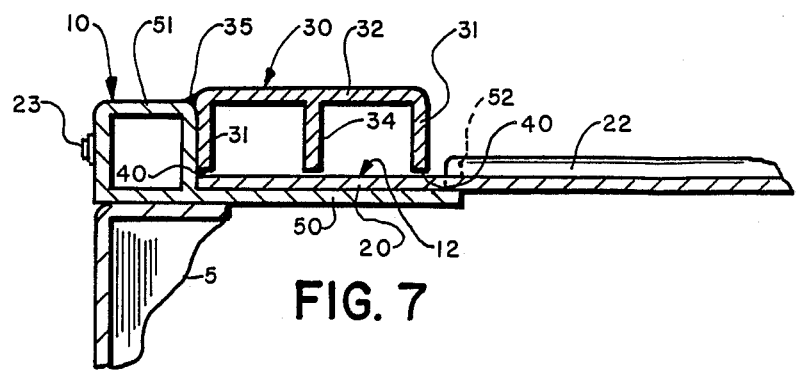
FIG. 7 is a fragmentary sectional view taken on line 7—7, FIG. 6.
Figure 8:
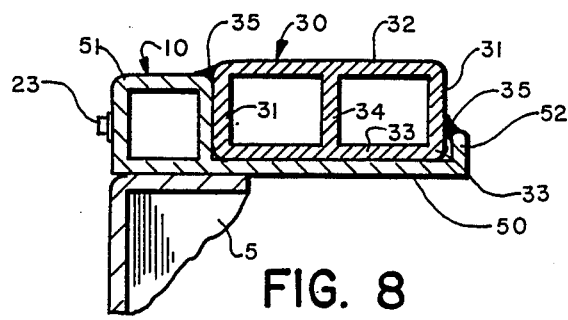
FIG. 8 is a fragmentary sectional view taken on line 8—8, FIG. 6.

In accordance with a main feature of the present invention, each side frame member 10 includes a generally elongated, rectangular-shaped box channel, indicated generally at 30, which is attached to a rear end thereof (FIGS. 2, 5 and 10). Box channels 30 are similar so that only one will be described in detail. Box channel 30 is an extruded integral one-piece member preferably formed of aluminum. Box channel 30 is formed with a pair of spaced, parallel sidewalls 31, a pair of spaced parallel top and bottom walls 32 and 33, respectively, which extend transversely between sidewalls 31, and an intermediate wall 34 spaced from and parallel to each of the sidewalls 31 and extending transversely between the top and bottom walls 32 and 33. Bottom wall 33 is removed from a rear portion of box channel 30. Box channel 30 is attached to the rear end of side frame member 10 by a plurality of welds 35, so that bottom wall 33 of the box channel 30 abuts flat base 50 of side frame member 10 (FIGS. 6-8). A channel 40 generally is formed between a lower end of the sidewalls 31 and the intermediate wall 34 of the rear portion of the box channel 30, and flat base 50 of side frame member 10 (FIGS. 7 and 10).

A rear end of tubular upright flanges 51 of side frame members 10 also are cut after extrusion at approximately a 45° angle (FIGS. 5 and 10) with respect to a longitudinal axis of the side frame members, to provide for ease of fitting and removal of flexible cover 2 over and from frame assembly 1.

A plurality of complementary snap fasteners 23 (FIGS. 4 and 5) are mounted on an outer surface of tubular flanges 51 and 21 of side frame members 10 and front and rear frame members 11-12, respectively, for releasably engaging a plurality of complementary snap fasteners 25 attached along a periphery of cover 2 (FIGS. 1 and 2) for removably attaching the cover to frame assembly 1. Alternatively, and in accordance with a second embodiment of the present invention (FIG. 3), hook and pile fabric materials 26 and 27, respectively, of the type identified by the well-known trademark "VELCRO", can be attached to the outer surface of tubular flanges 51 and 21 and along the periphery of cover 2, for releasably attaching the cover to the frame assembly.

Improved frame assembly 1 of the present invention is assembled and used in the following manner. Each side frame member 10 is mounted on the top edge of the upright truck sidewalls 5 in the manner described above so that flat base 50 of the side frame members rests on the generally flat top edge of the sidewalls. Front frame member 11 then is mounted on the top edge of truck front wall 6 so that flat base 20 of frame member 11 similarly rests on the generally flat top edge of the front wall. If desired, a gasket or seal can be inserted between flat bases 50 and 20 of side and front frame members 10 and 11, respectively, and the top edge of sidewalls 5 and front wall 6 to aid in preventing the infiltration of moisture, dirt, etc. therebetween and onto enclosed truck bed 3.

In accordance with one of the important features of the invention, when it is desired to protect bed 3 of truck 4 and any contents carried thereon by flexible cover 2, tailgate 7 is closed and rear frame member 12 is slideably engaged with side frame members 10. More specifically, each end of flat base 20 of rear frame member 12 is slideably engaged in slide channel 40 of a respective one of side frame members 10, as shown particularly in FIGS. 6 and 7. Bottom wall 33 of each box channel 30 acts as a stop by engaging flat base 20 of the ends of rear frame member 12, after the frame member is fully slideably inserted in channels 40 and between side frame members 10. Flexible cover 2 then is mounted on frame assembly 1 by snap fasteners 23 and 25 or hook and pile fabric materials 26 and 27, and the tension of the attached flexible cover retains rear frame member 12 securely in place.

When it is necessary to utilize the pickup truck for carrying loads in which the cover is either impractical or not desired, or for loading or unloading a covered load, cover 2 is removed and rear frame member 12 is quickly and easily slideably disengaged from channels 40 of side frame members 10 to provide unobstructed access to truck bed 3 through opening 8 upon movement of tailgate 7 to the open position. In some prior art frame assemblies, the rear frame member which traverses the tailgate opening only can be removed from the remainder of the frame assembly by disassembling nuts and bolts or other types of fasteners. This is an inconvenient procedure to undertake each time it is desired to utilize the pickup truck for different chores or for loading or unloading. It readily can be seen that such inconvenience is eliminated by the construction and operation of the frame assembly of the present invention.

In summary, it can be seen that frame assembly 1 provides a means for securely removably attaching a flexible cover to selectively protect the items carried on an open bed of a pickup truck from weather such as rain, snow, wind, etc., and/or for effectively concealing the items carried on the bed from normal view. It further can be seen then when it is desired to utilize the pickup truck for tasks necessitating that the bed be uncovered, or for loading or unloading cargo when the cover is in use, the rear transverse frame member which extends across the tailgate opening of the pickup truck, and which would normally interfere with movement across the tailgate opening, can be quickly and easily removed so that unobstructed access can be gained to the pickup truck bed.

Moreover, the improved frame assembly can be produced by the extrusion manufacturing process and requires only two extrusion dies and several minor cutting operations to complete. This simple manufacturing procedure enables the frame assembly to be produced relatively inexpensively for nearly every size and style of pickup truck. Finally, the frame assembly is formed of strong, durable, low-maintenance materials which blend in well with all pickup truck styles.

Again, one of the key features of the present invention is the structure of the frame assembly enabling the rear frame member to be slideably engageable with the side frame members, so that the frame assembly can be quickly and easily converted between a condition in which a flexible cover can be attached thereto for protecting the open bed of the truck, and a partially disassembled state wherein full access to the truck bed across the tailgate opening is maintained.

Accordingly, the improved frame assembly for pickup truck bed covers is simplified, provides an effective, safe, inexpensive, and efficient assembly which achieves all the enumerated objectives, provides for eliminating difficulties encountered with prior assemblies, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved frame assembly for pickup truck bed covers is constructed and used, the characteristics of the construction, and the advantageous, new and useful results obtained; the new and useful structures, devices, elements, arrangements, parts and combinations, are set forth in the appended claims.

I claim:

1. A combination of a pickup truck, a cover, and a frame assembly for attaching the cover over an open bed of the pickup truck, said truck bed having a pair of spaced, parallel upright sidewalls and a pair of spaced, parallel upright front and rear walls, said rear wall being movable between open and closed positions, said assembly including:
   (a) a pair of spaced, parallel elongated side frame members mounted on and extending along the upright sidewalls;
   (b) an elongated front frame member mounted on and extending along the upright front wall, and generally between a front end of the side frame members;
   (c) means attached to a rear end of each of the side frame members for forming a channel therebetween; and
   (d) an elongated rear frame member extending along the upright rear wall, and generally between the rear ends of the side frame members, said rear frame member being directly slideably engageable within the channels formed between the side frame members and the means attached to the rear ends of said side frame members, so that subsequent to detachment of the cover from the frame assembly, the rear frame member is slideably disengaged from said channels to provide unobstructed access to the truck bed upon movement of the rear wall of the truck to the open position.

2. A frame assembly for removably attaching a cover on an open bed of a pickup truck, said truck bed being defined by a pair of spaced, parallel upright sidewalls and a pair of spaced, parallel upright front and rear walls extending transversely between said sidewalls, with said rear wall being movable between open and closed positions, said frame assembly including:
(a) a pair of spaced, parallel elongated side frame members mounted on and extending along a top edge of the upright sidewalls;
(b) an elongated front frame member mounted on and extending along a top edge of the upright front wall, and generally between a front end of the side frame members;
(c) an elongated rear frame member extending along a top edge of the upright rear wall, and generally between a rear end of the side frame members; and
(d) a pair of members each formed with at least one depending flange and being attached to the rear end of a respective one of the side frame members for forming a channel therebetween, said channel generally being formed between a lower end of the depending flange of the member and its respective side frame member, whereby a pair of ends of the rear frame member are slideably engageable within said channels so that subsequent to detachment of the cover from the frame assembly, the rear frame member is slideably disengageable from said channels to provide unobstructed access to the truck bed upon movement of the rear wall of the truck to the open position.

3. A frame assembly for removably attaching a cover on an open bed of a pickup truck, said truck bed being defined by a pair of spaced, parallel upright sidewalls and a pair of spaced, parallel upright front and rear walls extending transversely between said sidewalls, with said rear wall being movable between open and closed positions, said frame assembly including:
(a) a pair of spaced, parallel elongated side frame members mounted on and extending along a top edge of the upright sidewalls, said side frame members each including a flat base and an upright flange formed along an outer edge of said base;
(b) an elongated front frame member mounted on and extending along a top edge of the upright front wall, and generally between a front end of the side frame members, said front frame member including a flat base and an upright flange formed along an outer edge of said base;
(c) an elongated rear frame member extending along a top edge of the upright rear wall, and generally between a rear end of the side frame members, said rear frame member including a flat base and an upright flange formed along an outer edge of said base; and
(d) a pair of generally elongated, rectangular-shaped box channels each formed with a pair of spaced, parallel sidewalls, a pair of spaced, parallel top and bottom walls extending transversely between the sidewalls, and an intermediate wall spaced from and parallel to each of said sidewalls and extending transversely between said top and bottom walls; said box channels each being attached to the rear end of a respective one of the side frame members for forming a channel therebetween, wherein the bottom wall of each of said box channels abuts the flat base of its respective side frame member; in which the bottom wall is removed from a rear portion of each of the box channels; and in which a slide channel generally is formed between a lower end of the sidewalls and the intermediate wall of the rear portion of each of the box channels, and the flat base of its respective side frame member, so that the flat base of a pair of ends of the rear frame member slideably engages the slide channels, rests on the flat base of the side frame members and abuts the bottom wall of the box channels upon full insertion of the rear frame member into said slide channels, so that subsequent to detachment of the cover from the frame assembly, the rear frame member is slideably disengageable from said slide channels to provide unobstructed access to the truck bed upon movement of the rear wall of the truck to the open position.

4. A frame assembly for removably attaching a cover on an open bed of a pickup truck, said truck bed being defined by a pair of spaced, parallel upright sidewalls and a pair of spaced, parallel upright front and rear walls extending transversely between said sidewalls, with said rear wall being movable between open and closed positions, said frame assembly including:
(a) a pair of spaced, parallel elongated side frame members mounted on and extending along a top edge of the upright sidewalls, said side frame members each including a flat base and an upright flange formed along an outer edge of said base;
(b) an elongated front frame member mounted on and extending along a top edge of the upright front wall, and generally between a front end of the side frame members, said front frame member including a flat base and an upright flange formed along an outer edge of said base;
(c) an elongated rear frame member extending along a top edge of the upright rear wall, and generally between a rear end of the side frame members, said rear frame member including a flat base and an upright flange formed along an outer edge of said base; and
(d) a pair of generally elongated, rectangular-shaped box channels each being a similar, extruded, integral one-piece member formed of aluminum and with a pair of spaced, parallel sidewalls, a pair of spaced, parallel top and bottom walls extending transversely between the sidewalls, and an intermediate wall spaced from and parallel to each of said sidewalls and extending transversely between said top and bottom walls; said box channels each being welded to the rear end of a respective one of the side frame members for forming a channel therebetween, wherein the bottom wall of each of said box channels abuts the flat base of its respective side frame member; in which the bottom wall is removed from a rear portion of each of the box channels; and in which a slide channel generally is formed between a lower end of the sidewalls and the intermediate wall of the rear portion of each of the box channels, and the flat base of its respective side frame member, so that the flat base of a pair of ends of the rear frame member slideably engages the slide channels, rests on the flat base of the side frame members and abuts the bottom wall of the box channels upon full insertion of the rear frame member into said slide channels, so that subsequent to the detachment of the cover from the frame assembly, the rear frame member is slideably disengageable from said slide channels to provide unobstructed access to the truck bed upon movement of the rear wall of the truck to the open position.

5. A frame assembly for attaching a cover over an open bed of a pickup truck, said truck bed having a pair of spaced, parallel upright sidewalls and a pair of spaced, parallel upright front and rear walls, said rear wall being movable between open and closed positions, said assembly including:
 (a) a pair of first frame members each securely mounted on a respective one of the sidewalls of the truck bed;
 (b) a second frame member extending transversely between the first frame members generally adjacent to the rear wall of the truck; and
 (c) a pair of members each formed with at least one depending flange and being attached to a respective one of the first frame members for generally forming a channel between a lower end of the depending flange of each of said members and its respective first frame member, whereby a pair of ends of the second frame member engages the channels so that said second frame member is disengageable from said first frame members.

6. A frame assembly for attaching a cover over an open bed of a pickup truck, said truck bed having a pair of spaced, parallel upright sidewalls and a pair of spaced, parallel upright front and rear walls, said rear wall being movable between open and closed positions, said assembly including:
 (a) a pair of first frame members each securely mounted on a respective one of the sidewalls of the truck bed, said first frame members each including a flat base and an upright flange formed along an outer edge of said base;
 (b) a second frame member extending transversely between the first frame members generally adjacent to the rear wall of the truck, said second frame member including a flat base and an upright flange formed along an outer edge of said base; and
 (c) a pair of rectangular-shaped box channels each formed with a pair of spaced, parallel sidewalls, a pair of spaced, parallel top and bottom walls extending transversely between the sidewalls, and an intermediate wall spaced from and parallel to each of said sidewalls and extending transversely between said top and bottom walls; said box channels each being attached to a respective one of the first frame members for forming a channel therebetween, wherein the bottom wall of each of said box channels abuts the flat base of its respective first frame member; in which the bottom wall is removed from a rear portion of each of the box channels; and in which an engagement channel generally is formed between a lower end of the sidewalls and the intermediate wall of the rear portion of each of the box channels, and the flat base of its respective first frame member, so that the flat base of a pair of ends of the second frame member slideably engages the engagement channels, rests on the flat base of the first frame members and abuts the bottom wall of the box channels upon full insertion of the second frame member into said engagement channels, so that said second frame member is disengageable from said first frame members.

7. The assembly defined in claim 4 in which an inner edge of the flat base of the side, front and rear frame members is formed with an upright lip to provide additional strength to said frame members; and in which the upright lip extends along at least a substantial length of the inner edge of each of the frame members.

8. The assembly defined in claim 4 in which the upright flange of the side, front and rear frame members is generally tubular-shaped to provide strength to said flange.

9. The assembly defined in claim 7 in which a rear end of each of the tubular upright flanges of the side frame members is formed at a 45° angle with respect to a longitudinal axis of the side frame members to provide for ease of fitting and removal of the cover over and from the frame assembly.

10. The assembly defined in claim 4 in which fastening means is located on an outer surface of the upright flange of the frame members and is adapted to releasably engage fastening means located about a periphery of the cover for removably attaching said cover to the frame assembly.

11. The assembly defined in claim 10 in which the cover fastening means and the frame assembly fastening means comprise a plurality of releasable connectors.

12. The assembly defined in claim 10 in which the cover fastening means and the frame assembly fastening means comprise releasably connecting hook and pile fabric materials.

13. The assembly defined in claim 4 in which the side, front and rear frame members each is a similar, extruded, integral one-piece member formed of aluminum.

14. The assembly defined in claim 4 in which the movable rear wall of the pickup truck is a hingedly mounted tailgate; and in which the tailgate is pivotable between an upright closed position and a horizontal open position.

15. The assembly defined in claim 4 in which the cover is flexible.

16. The assembly defined in claim 6 in which the upright flange of the first and second frame members is generally tubular shaped to provide strength to said flange.

* * * * *